UNITED STATES PATENT OFFICE.

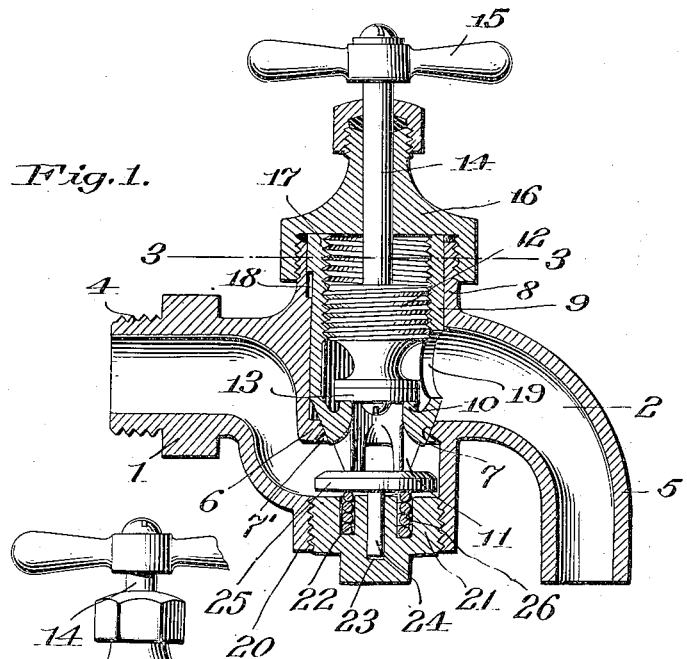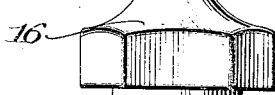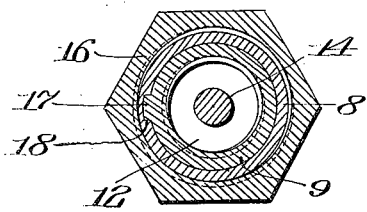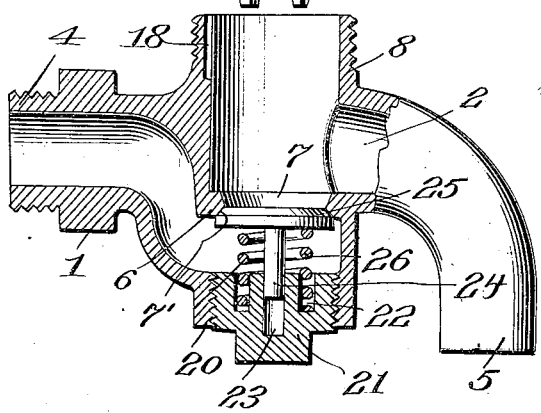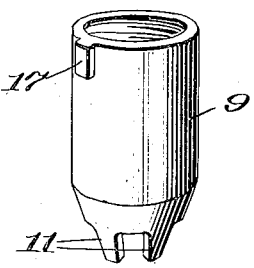

FRANCIS J. BIBLEHEISER, JR., OF BALTIMORE, MARYLAND.

FAUCET.

1,226,175.  Specification of Letters Patent.  Patented May 15, 1917.

Application filed July 25, 1914. Serial No. 853,211.

*To all whom it may concern:*

Be it known that I, FRANCIS J. BIBLEHEISER, Jr., a citizen of the United States, residing in the city of Baltimore and State of Maryland, have invented new and useful Improvements in Faucets, of which the following is a specification.

This invention relates to improvements in faucets or spigots and has particular application to a double valved faucet.

In carrying out the present invention, it is my purpose to provide a faucet which will embody a main valve and a supplemental valve, the supplemental valve being held normally in open position and moving to closed position automatically when the main valve is removed from the body of the faucet for repairing or cleaning, thereby preventing water or other fluid escaping through the faucet and eliminating the use of cut off cocks and the like.

It is also my purpose to improve and simplify the general construction of faucets of the class described and to provide a faucet wherein the component parts may be readily assembled and taken apart.

With the above and other objects in view, the invention consists in the construction, combination and arrangement of parts hereinafter set forth in and falling within the scope of the claim.

In the accompanying drawing:

Figure 1 is a vertical longitudinal sectional view through a faucet constructed in accordance with the present invention.

Fig. 2 is a similar view showing the main valve and cage removed from the body of the faucet.

Fig. 3 is a horizontal sectional view on the line 3—3 of Fig. 1.

Fig. 4 is a perspective view of the cage of the main valve removed from the body of the faucet.

Referring now to the drawing in detail, 1 designates the body of the faucet having a fluid passage 2 therethrough and formed at one end with a connecting nipple 4 and at the opposite end with a downwardly extending discharge spout 5, as usual. Formed on the inner surface of the body 1 across the passage 2 is a right angular partition 6 having a vertical wall and a horizontal wall, the latter being spaced apart a short distance from the bottom of the body and formed with an opening 7 having the lower edge of the wall thereof formed to provide a valve seat 7'. Formed on the upper portion of the body 1 coaxial with the opening in the horizontal limb of the partition 6 and opening into the passage 2 at the discharge side of the partition is a nipple 8 having the upper end portion thereof threaded exteriorly, while passed through the nipple 8 and into the passage 2 is a cylindrical cage 9 having the lower edge of the wall thereof formed with an inwardly projecting annular seat 10 disposed concentrically of the axis of the cage and provided with a number of depending fingers 11 spaced equal distances apart and designed to project through the opening 7 in the horizontal limb of the partition 6 in the normal position of the cage. The wall of the cage 9 adjacent to the upper end thereof is threaded interiorly to receive a main valve plug 12 having the lower surface thereof equipped with a washer 13, as usual, and designed to engage the valve seat 10 when the plug is rotated in one direction so as to cut off the flow of fluid through the passage 2. Connected to the upper end of the plug 12 and extending upwardly therefrom is a stem 14 having the upper extremity equipped with a handle 15. whereby the stem and main plug valve may be rotated to move the valve toward and away from its seat. Threaded onto the upper end of the nipple 8 and inclosing the upper extremity of the valve cage 9 is a bonnet 16 surrounding the stem 14 and acting to prevent leakage around the parts. In the present instance, the upper end portion of the valve cage 9 is formed with an outwardly projecting locking lug 17 designed to engage a slot 18 formed on the inner face of the nipple 8 to lock the valve cage against rotation within the body of the faucet, while formed in the side wall of the cage adjacent to the lower end thereof and designed to establish communication between the interior of the cage and the discharge spout 5 of the faucet is an opening 19.

The bottom wall of the body 1 of the faucet coaxial with the nipple 8 is formed with a depending nipple 20 and threaded into the depending nipple 20 and disposed upon the inlet side of the partition is a plug 21 having the inner face thereof formed with an annular recess 22 and a bore 23 centrally of such recess. Slidably disposed within the bore 23 is a stem 24 carrying at its upper end a valve disk 25 adapted to engage the seat 7' and normally held in lowered or inactive position under the action of the fingers 11 on the lower end of the valve cage. Disposed within the recess 22 is a coiled expansion spring 26 having the lower end abutting the bottom wall of the recess and the upper end in engagement with the upper surface of the valve disk 25.

From the foregoing description taken in connection with the accompanying drawing, the construction and manner of employing my invention will be readily apparent. Under normal conditions the cage 9 is disposed within the body 1 and held therein by means of the bonnet 16, the opening 19 registering with the discharge spout 5 of the body. When the stem 14 is rotated in one direction the main plug valve 12 is lowered and so engages the seat 10, thereby cutting off the flow of fluid through the passage 2. On the other hand, when the direction of rotation of the stem 14 is reversed the main plug valve is disengaged from the seat 10 so that water or other fluid may be drawn from the faucet. As long as the cage 9 is in proper position in the body, the fingers 11 engage the supplemental valve disk 25 and hold the latter in inactive position against the action of the spring 26 and when it is desired to replace the washer 13 or otherwise repair the cage 9 or the main plug valve, the bonnet 16 is removed and the cage lifted out of the body of the faucet. As the cage is withdrawn from the faucet, the supplemental valve disk 25 is relieved of the influence of the fingers 11 so that the spring 26 reacts and so forces the supplemental valve disk into engagement with the valve seat 7 thereby automatically cutting off the flow of fluid through the passage 2 while the main valve is out of the body.

I claim:

In a faucet, in combination a body having a fluid passage therethrough and formed with a connecting nipple at one end of said fluid passage, said body being formed on its inner surface across said passage with a vertical wall and a horizontal wall, the latter being spaced above the bottom of the faucet and having an opening the lower side of the wall surrounding the opening forming a conical valve seat, and the upper side of said wall forming a conical seat disposed in an opposite direction to the first seat, a nipple on said body coaxial with said opening, a cylindrical cage mounted in said nipple and engaging said vertical wall, said cage being held against rotation in said nipple, and having a plurality of depending fingers having inclined edges engaging against the second named seat but projecting below the first named seat, said cage also having a port for communication with said fluid passage, a valve adapted to close said port, a plug threaded into the bottom of said body opposite the lower seat and having a vertical bore, a rod slidable in said bore, a valve carried by said rod, a spring in said plug pressing the last named valve against said fingers, the latter holding said valve spaced from the first named valve seat, and a bonnet engaging said last named nipple and also said cage to hold said fingers against the second named seat, the last named valve having a conical surface urged by said spring to engage said first named seat when said cage is removed.

In testimony whereof I affix my signature in presence of two witnesses.

FRANCIS J. BIBLEHEISER, Jr.

Witnesses:
 HENRY B. MANN,
 JOSEPHINE L. COLLINS.